United States Patent [19]

Krasutsky

[11] Patent Number: 4,970,403

[45] Date of Patent: Nov. 13, 1990

[54] FOCAL ARRAY REIMAGING SYSTEM

[75] Inventor: Nicholas J. Krasutsky, Farmers Branch, Tex.

[73] Assignee: LTV Aerospace and Defense Company, Dallas, Tex.

[21] Appl. No.: 273,963

[22] Filed: Nov. 18, 1988

[51] Int. Cl.[5] .............................................. H01J 3/14
[52] U.S. Cl. .................................... 250/216; 350/451
[58] Field of Search ............... 250/216, 209, 578, 201, 250/221; 350/451; 358/293

[56] References Cited

U.S. PATENT DOCUMENTS

| | | | |
|---|---|---|---|
| 3,536,917 | 10/1970 | Desvignes | 250/83.3 |
| 3,554,629 | 1/1971 | Takashi | 350/2 |
| 3,742,238 | 6/1973 | Hoffman, II | 250/347 |
| 3,963,926 | 6/1976 | Borrello | 250/338 |
| 4,114,037 | 9/1978 | Westwood | 250/216 |
| 4,302,673 | 11/1981 | Bly | 250/332 |
| 4,306,150 | 12/1981 | Dietz | 250/332 |
| 4,327,291 | 4/1982 | Chapman et al. | 250/332 |
| 4,335,305 | 6/1982 | Seachman | 350/451 |
| 4,377,753 | 3/1983 | Mir | 250/216 |
| 4,398,786 | 8/1983 | Neal | 350/1.4 |
| 4,410,804 | 10/1983 | Stauffer | 250/216 |
| 4,431,917 | 2/1984 | Gibbons | 250/332 |
| 4,539,474 | 9/1985 | Takahata | 250/221 |
| 4,558,222 | 12/1985 | Neal | 250/353 |
| 4,583,814 | 4/1986 | Koetser | 350/1.2 |
| 4,618,768 | 10/1986 | Weigel | 250/334 |
| 4,692,608 | 9/1987 | Cooper et al. | 250/578 |
| 4,814,628 | 3/1989 | Eichweber | 250/221 |

Primary Examiner—David C. Nelms
Attorney, Agent, or Firm—Arnold, White & Durkee

[57] ABSTRACT

The present invention relates to an optical reimaging system which incorporates multiple sets of lenses to transmit an image from one plane to another in the form of image segments which are detected by one or more discrete detector arrays. Signals generated by the detector array or arrays can be used to recombine the image segments to reproduce the image transmitted from the first focal plane. These image segments can be contiguous or separated, inverted or not, depending on the lens arrangment and magnification used. In infrared applications, all or a portion of the reimaging system may be cooled to reduce contaminating warm radiation.

24 Claims, 2 Drawing Sheets

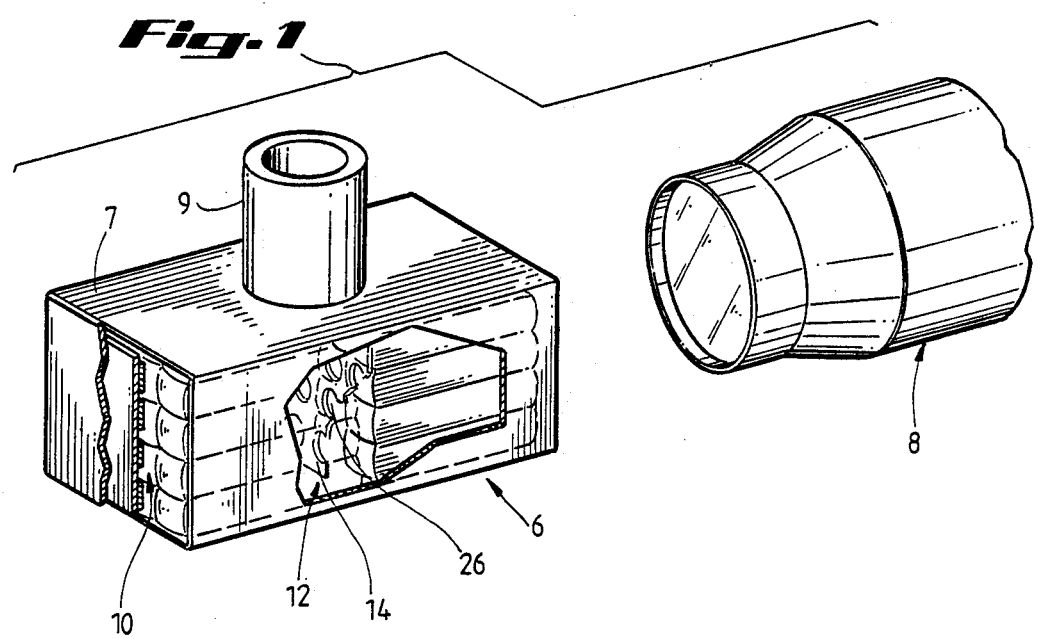
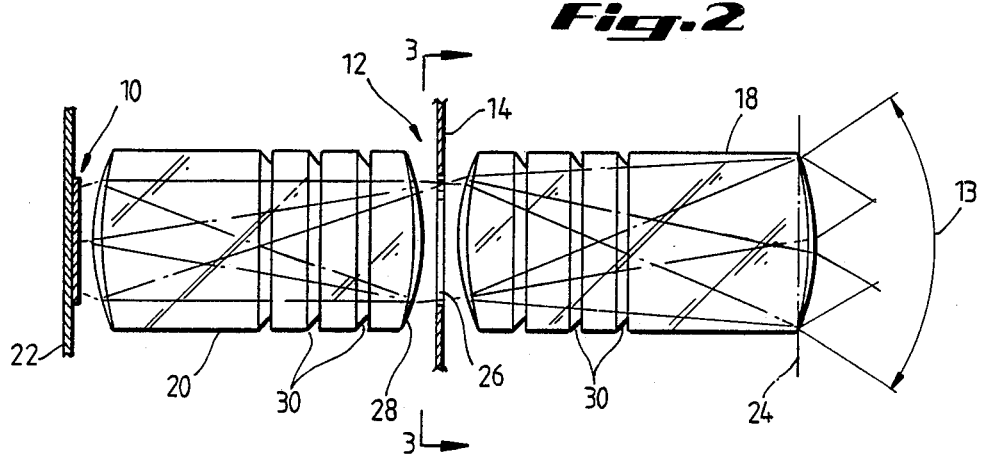

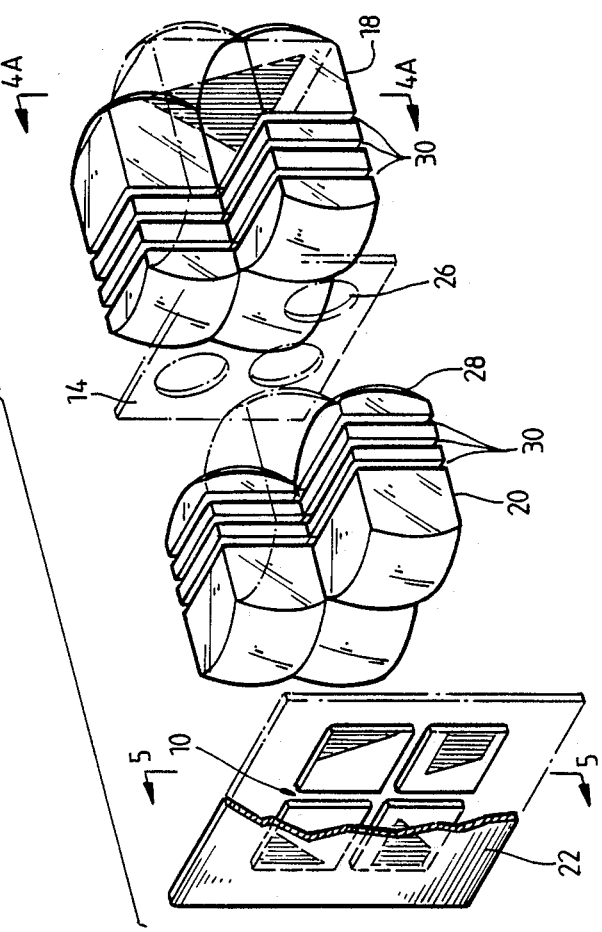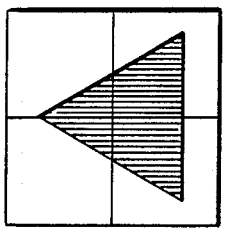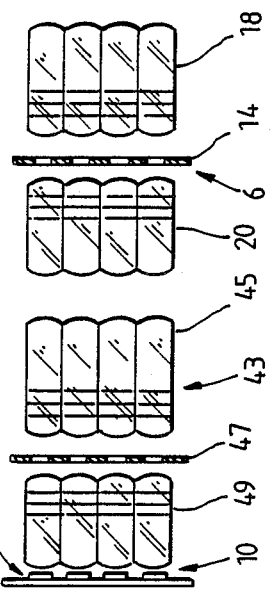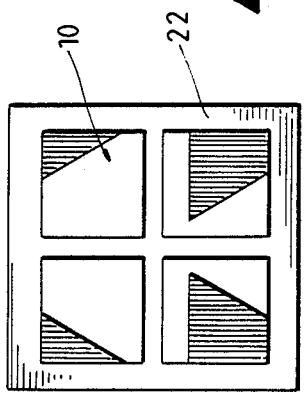

FOCAL ARRAY REIMAGING SYSTEM

BACKGROUND OF THE INVENTION

The present invention relates to an optical reimaging system. More specifically, the invention relates to an infrared optical reimaging system which incorporates a plurality of lens sets to transfer to one or more detector arrays an image produced by an imaging system, such as a telescope. This reimaging system can incorporate a number of small detector arrays to be used instead of a single large array of detectors. The lenses in the reimaging system can be arranged to provide reduction of the image if necessary to accommodate the small detector arrays.

The principal, though not exclusive, application of the present invention is in infrared detection and image transmissions. Among the principal concerns of infrared optical systems is "noise" produced in the final image by warm radiation emanating from the imaging system itself. A second concern is preventing stray rays from outside the desired field of view from becoming part of the final image produced by the system.

It is therefore desirable in infrared imaging systems to reduce noise generated by warm radiation emanating from the system itself and to reduce the amount of stray warm radiation appearing in the image to be viewed. It is well known that warm radiation from the imaging system itself can be prevented or reduced by "cold shielding". Cold shielding refers to the physical cooling of all or part of an optical system by various known refrigeration means. Effective cold shielding can be had by cooling only that part of the system between the detectors and nearest aperture stop or baffle, since the aperture will itself protect the final image from radiation emanating from system parts between the aperture and the field of view. In addition, the aperture itself should be cooled to reduce the amount of warm radiation emanating from it.

Use of an aperture stop in the system provides one means for eliminating or reducing the stray warm radiation from outside an infra-red imaging system, as shown in the U.S. Pat. No. 3,963,926 to Borrello and U.S. Pat. No. 4,583,814 to Koetser. The Borrello patent describes a system wherein an image produced by a primary optical system strikes separate detectors in a large detector array. Interposed between the detector array and the primary system is an overlay with a plurality of apertures—one aperture corresponding to each detector. In accordance with the Borrello system, each detector in the detector array "sees" only one segment of the image due to the configuration of the array and walls which separate the individual detectors.

Significant problems appear to exist with Borrello and other prior art systems which use large detector arrays to detect an image produced by a primary optical system, i.e., a scanner or telescope. Detector arrays are made, in at least one form, of rows and columns of discrete detectors. It is known in the industry that the proportion of defects in the detector array increases in proportion to the square of detectors in the array. For such high density arrays, manufacturing yields are low because of the increased chance of having at least one defective detector in the array. Large detector arrays also have problems with placement of the leads (conductors connecting the detectors to the sensing circuitry). Power requirements can also become restrictive. Optical baffling between detectors is not easily accomplished. Further, individual detector arrays remain susceptible to blinding and damage from laser threats principally in military applications. The present system reduces or eliminates these problems by permitting the use of smaller detector arrays, for instance ones having 16×16 detectors in an array as compared to the 128×128 detectors in arrays used in some current systems.

A further problem with the Borrello and other systems is that as the size of the focal plane increases, the focal length must also increase to maintain the same optical characteristics. As a consequence, efficient cold shielding requires much greater cooling of larger portions of the optical trains of such systems. The present system can accommodate increases in focal plane size by addition of lens sets identical to those already in the system, and no increase in focal length is necessary.

SUMMARY OF THE INVENTION

The present invention in a general aspect comprises a system for receiving images and projecting the images in a sectionalized manner onto a plane having one or more discrete arrays of infrared detectors. A conventional optical system such as a telescope is used to obtain an image. This image is brought into focus on a first focal plane which is coincident with the leading or incident surfaces of the first lenses of a plurality of lens sets, each first lens being capable of transmitting electromagnetic radiation, such as infrared light. Each of the first lenses is part of a separate lens set, wherein the remaining lens or lenses in each set are optically aligned behind the respective first lens. In other words, the lenses in each set are centered on a common optical axis, and radiation comprising the segment of the image seen by a particular first lens passes through the first lens and then through the remaining lens or lenses in each set. Each lens set transmits the associated image segment to a separate detector array or a part of a single detector array and the lens sets can be sized and positioned such that the image segment fills the field of view of the associated detector array or the respective portion of a single detector array. The image from each separate detector array may be composited or combined electronically or by other suitable means into a resultant image which appears to have been produced by one continuous large detector array.

A baffle with apertures may be placed generally perpendicular to the optical axes of the lens sets and between a first and second subset of lenses in each lens set. The aperture effect can also be created by painting a baffle or otherwise affixing an aperture opening on the face of the lens in the second lens subset which is nearest the first lens set.

The detectors or transducers in each detector array generate signals in response to the electromagnetic radiation they receive. When the system is configured to use numerous smaller detector arrays instead of one large detector array, similar signals are generated by adjacent arrays of detectors associated with other sets of lenses and their apertures.

In infrared application, contaminating radiation may be substantially reduced by cooling the lenses and associated baffles and the like. The cooling may achieved in a number of ways. One simple way is to cool thermally conductive material which is in physical contact with the lenses and the like, and which in turn may be cooled by means of a liquid refrigerant. The individual lens sets and the baffle, if any, may be placed in a housing. The housing can contain refrigerant which will serve to cool the optical system. A second set of lenses may be inserted between each first set and the detector array or arrays to reinvert the image before it is seen by the detectors.

BRIEF DESCRIPTION OF THE DRAWINGS

FIG. 1 is an orthogonal, partially cut-away view of a lens system of the invention in which an assembly of lens sets (sets of two lenses are depicted in the embodiment) is positioned in a housing and used in combination with a primary optical projecting system and detector arrays.

FIG. 2 is a cross-sectional side view of one of the lens sets and a portion of the baffle between the two lenses.

FIG. 3 is a plan view of a portion of the baffle.

FIG. 4 is an exploded view of a portion of the optical system, including lens sets, baffle, detector arrays, a detector support, and also depicting the transmission of a portion of a triangular image by the lens sets shown.

FIG. 4A is a depiction of the triangular image as it appears at the first focal plane coincident with the front surfaces of the first lenses of the system in FIG. 4.

FIG. 5 is a depiction of the image segments transmitted to the detector arrays by the optical system of FIG. 4.

FIG. 6 is a side view of a second embodiment of an imaging system which produces a properly oriented image at the detector plane.

DESCRIPTION OF PREFERRED EMBODIMENT

An embodiment of the present invention will now be described by way of example with reference to the aforementioned drawings.

As is shown in FIG. 1, an embodiment of the present invention includes a reimaging system 6 which is placed in optical alignment between a primary optical system 8 and a set of detector arrays 10. The reimaging system 6 is comprised of a plurality of lens pairs 12, one of which is shown more fully in side view in FIG. 2. The reimaging system 6 and the detector arrays 10 may be contained in a housing 7.

FIG. 2 shows a lens pair 12 of a plurality of lens pairs, which together with the baffle 14 and detector arrays 10 form the reimaging system 6. Each lens pair 12 comprises two elongated lenses in optical alignment. A pair of separate elongated lenses are shown but any lens system comprising a lens set that serves their optical function can be substituted. Primary optical system 8 produces an image at focal plane 24. A first lens 18 of the lens pair 12 has a field of view 13 which intersects the image at focal plane 24 to define a segment of the image produced by the primary optical system 8. The first lens 18 is spaced relative to the primary optical system 8 so that the front surface of the first lens 18 is coincident with the focal plane 24. In this manner, segments of the image at the focal plane 24 seen by the adjacent first lenses 18 may be contiguous. The image segment associated with a particular one of the first lens 18 passes through a second lens 20 and strikes an associated one of the detector arrays 10.

Each of the detector arrays 10 is comprised of a number of electromagnetic radiation detectors (not shown) of any of several suitable types known in the art which produce electrical signals in relation to the amount or characteristics of the radiation they receive. For example, in infrared applications the detector arrays 10 would be formed of infrared detectors. The detector arrays 10, each comprising in one embodiment 16×16 detectors, are mounted equidistant in columns and rows on detector support 22, as shown in FIGS. 2 and 4. Lead lines (not shown) necessary to supply power to and receive signals from the detectors may be conveniently affixed to detector mount 22 in the spaces between the detector arrays 10.

Referring to FIGS. 4 and 5, the first lens 18 and the second lens 20 may be sized and positioned such that the image produced at the detector array 10 is a reduced and inverted version of the image segment "seen" by the first lens 18 at the focal plane 24. This reduction results in a set of smaller images, each centered on the optical axis of a given lens pair.

In a preferred embodiment, a baffle 14 is inserted between and perpendicular to the set of first lenses 18 and the set of second lenses 20 as is shown in both FIGS. 1 and 2. A portion of the baffle 14 is depicted in FIG. 3. As can be seen from FIG. 3, the baffle 14 has apertures 26, each of which corresponds to one lens pair 12. The baffle 14 can be made of any suitable material which will absorb light, and in infrared applications, infrared light.

The lenses in each lens set (in this embodiment, the lens pair 12) are positioned in the embodiment so that the rays constituting the image segment associated with a particular first lens 18 will pass through the aperture 26 in the baffle 14 and then through its second lens 20 of the lens pair 12 to be detected by the detector array 10.

The baffle 14 and apertures 26 therein serve to exclude rays from outside the desired field of view 13 from entering the second lenses 20. The baffle 14 and the apertures 26 serve to keep the detector arrays 10 from "seeing" the walls of the first lenses 18. While in the preferred embodiment, this is accomplished by using as the baffle 14 a separate plate having apertures 26, those skilled in the art will readily see that the same ends can be accomplished by other means. One alternative baffle is created by blackening the periphery of a first surface 28 of the second lens 20, leaving uncovered a portion of the surface of the same or similar dimensions as the aperture 26 in the baffle 14.

The arrangement of the lenses 18 and 20 and the baffle 14 with the aperture 26 is also such that light rays from outside the desired field of view for a particular lens pair 12—as, for example, warm radiation from the primary optical system 8 or other sources—will arrive at such an angle that they will either be stopped by the baffle 14, i.e., not pass through the aperture 26, or at least not strike the detector array 10.

While the first lenses 18 and the second lenses 20 can be of any cross-sectional configuration and achieve most of the benefits of this invention, it is preferable that they be of a shape that when positioned adjacent similar lenses, no gaps will appear in the overall cross-section of the reimaging system 6. For instance, circular lenses would leave such gaps. Lenses of square cross-section, the type used in the preferred embodiment, do not leave such gaps. Lenses of hexagonal cross-section would also satisfy this criterion. Thus, the lenses are preferably of a geometric nature such that they transmit segments of an image which are compositable in the sense that they fit together without gaps.

The first lenses 18 can be joined to each other by any conventional means, such as gluing. The second lenses 20 can be joined in the same manner. If no housing 7 is used, the baffle 14 can be mounted to the first or second lenses. The detector arrays 10 can be mounted to a detector support 22 or joined and fixed to the second lenses 20 in any suitable manner. If the housing 7 is used, of course, all elements can be easily mounted within the housing 7.

The primary optical system 8 will ordinarily be adjustable so that it can be focused by any suitable means to make the focal plane 24 of the formed image coincident with the front surface of the first lenses 18. The first lenses 18 operate to refract the rays forming segments of the image at the focal plane 24 so that the rays pass through the apertures 26 in the baffle 14. The first lenses 18 and second lenses 20 can be sized and positioned to reduce the image appearing on the detector arrays 10. This reduction permits the detector arrays 10 to be spaced apart to allow room for the necessary lead lines (not shown). The lead lines are the electrical conduits necessary to transmit the electrical signals produced by the detectors, though in some applications the lead lines might also be used to transmit control or focusing signals to the system. As shown in FIGS. 4, 4A and 5, when the reduction is properly done, the image formed at any detector array 10 will correspond exactly, though inverted and reversed, to the image segment established by the intersection of the field of view 13 of the associated first lens 18 with the focal plane 24. When the images seen by each detector are joined, they can collectively be used to electronically reproduce the image produced by primary optical system 8 on the focal plane 24 as seen by the set of first lenses 18.

The resulting composite image is comparable in quality with single large images such as those described by Borrello and as known in the art. Slight imperfections in the compositing might in some instances create barely visible lines between adjacent images derived from adjacent sets of lenses and detector arrays; however, the reductions in noise attainable with the multiple arrays of the invention result in images of generally superior overall quality and also permit reduced manufacturing cost.

As noted earlier, in the case of infrared detection, it is desirable to cool all or part of the reimaging system to eliminate or effectively reduce warm radiation from the reimaging system 6 itself. If only part of the reimaging system 6 is cooled, it is known in the art that effective cold shielding can be achieved by cooling that portion between the detectors and the last aperture stop in the system. Here, effective cold shielding can thus be had by cooling the second lenses 20 and the baffle 14.

Another cooling system is to mount the reimaging system 6 in thermal contact with the projection 9 (see FIG. 1) which can be hollow, and capable of holding a coolant such as liquid nitrogen. The coolant will cool the projection 9, thereby cooling the reimaging system 6. This same system can be used if the reimaging system 6 is mounted in the housing 7 which in turn is joined to the projection 9, provided thermal contact between the reimaging system 6 and the projection 9 is maintained. This "cold-shielding" of the reimaging system 6 reduces the amount of its own warm radiation that will appear as noise in the final image.

A single large detector array could be used with appropriate signal processing to convert the sets of inverted images a respective portions of the single large detector array into a single large image, and the benefits of cold baffling could still be obtained. The images formed by the lens sets 12 could also in this configuration be made contiguous, particularly since no gaps exist at the detector plane.

An additional means of increasing the signal-to-noise ratio is to reduce stray radiation which may be reflected off the sides of the lenses and passed through the apertures to produce noise at the detector arrays 10. Noise from this source may be reduced by treating the sides of the lenses to render them capable of absorbing infrared light.

In a preferred embodiment the lenses are of germanium; however, lenses of silicon and other suitable materials known in the art may be employed. A thin layer of gold may be deposited on the outer surface of the lenses by sputtering or any of several other well-known methods of application. An effective method of rendering the sides absorbing is to deposit a layer of gold onto the outer surface of said lenses, then heat the lenses to diffuse the gold into the lens material. This diffusion layer should be kept thin and away from those portions of the lens through which desirable rays pass. Any other diffusion materials or any other coating method which renders the lens surface absorbing could be used. The gold-doped layer serves to absorb the infrared light, whose heat is then dissipated by virtue of the cold-shielding of the reimaging system.

Another means of reducing stray radiation, emanating either from the reimaging system 6 itself or particularly that entering the reimaging system 6 from outside the desired field of view of a first lens 18, is to cut grooves 30 (see FIGS. 2 and 4) in the outer surface of the elongated lenses 18 in a manner to scatter these unwanted rays back toward the front of the system. These grooves reduce the chance that stray rays (those emanating outside the desired field of view) will reflect off the sides of the lens and through the aperture 26 and eventually strike the detector arrays 10.

In particular, the grooves 30 may take a configuration as depicted generally in FIGS. 2 and 4, in which the face of each groove nearest the focal plane 24 is generally perpendicular to the axis of its lens pair to direct stray radiation it received toward the focal plane 24.

It should also be noted that as described, the disclosed embodiment will produce a set of inverted images at the detector arrays 10 as is most easily seen in FIGS. 4, 4A and 5. This will ordinarily not be a problem because the image can simply be reinverted electronically. However, in some applications it may be desirable to have a properly oriented image at the detector arrays 10. This can be accomplished by merely incorporating a second reimaging system 43 between the first reimaging system 6 and the detector arrays 10 as shown in FIG. 6. It has been determined that the benefits of the present invention can be realized by cooling only the baffle 47 and the fourth lens 49. In this reinverting arrangement, one need not cool any part of the first or second lenses 18 and 20, nor the first baffle 14, to realize the cold-shielding advantages previously described.

While the preferred embodiment of the present invention has been described with a certain degree of particularity, it is understood that certain substitutions and rearrangement of the parts thereof is possible within the spirit and scope of the present invention as hereinafter claimed.

What is claimed is:

1. A reimaging system, comprising:
    a plurality of lens sets for transmitting an image on a first focal plane to a second focal plane, each lens set having a plurality of optically aligned lenses;

a first lens in each lens set having a field of view defining a segment of the image at the first focal plane;

the remainder of the lenses in each lens set being operative together with the respective first lenses to transmit to a second focal plane the segment of the image defined by the field of view of the first lens of each lens set; and at least one detector array for detecting the image segments formed at the second focal plane and for generating signals suitable for reproducing the transmitted image.

2. A reimaging system as set forth in claim 1, wherein the optical axes of the lenses comprising the lens sets are in parallel.

3. A reimaging system as set forth in claim 2, wherein said first lenses have contiguous fields of view at the first focal plane.

4. A reimaging system as set forth in claim 3, comprising a plurality of detector arrays, wherein each said detector array is paired with a separate lens set.

5. A reimaging system as set forth in claim 4, wherein said detector arrays are comprised of detectors suitable for generating electrical signals in response to electromagnetic radiation.

6. A reimaging system as set forth in claim 4, wherein said detector arrays are in a plane perpendicular to the optical axes of said lens sets and each said detector array is centered on the optical axis associated with the lens set with which it is paired.

7. An imaging system as set forth in claim 6 wherein the lenses in each lens set are sized and positioned such that the image segment on the first focal plane within the field of view of a first lens of a lens set is transmitted and reduced or magnified to match the field of view at the second focal plane of the detector array associated with that lens set.

8. A reimaging system as set forth in claim 7, wherein each said lens set comprises first and second elongated lenses.

9. A reimaging system as set forth in claim 8, further comprising a baffle of light-absorbing material placed between said first and second lenses of each lens pair, said baffle defining a separate aperture corresponding to an aperture stop for each of said lens pairs.

10. The imaging system of claim 1 further comprising means to cool at least a portion of said imaging system.

11. The imaging system of claim 8 further comprising means to cool at least a portion of said imaging system.

12. The imaging system of claim 9 further comprising means to cool at least a portion of said imaging system.

13. An imaging system as set forth in claim 8 wherein one or more of the lenses have sides capable of absorbing infrared light.

14. An imaging system as set forth in claim 12 wherein at least one lens in each lens set has grooves on its surface sufficient to reduce the transmission of stray electromagnetic radiation through the lens or lenses.

15. A reimaging system as set forth in claim 1 for transmitting an image from a first focal plane to a second focal plane wherein the lenses in each lens set are arranged so that each image segment on the second focal plane has the same orientation as on the first focal plane.

16. A reimaging system as set forth in claim 1 in which the lenses have a geometry capable of transmitting segments of an image wherein the segments fit together or composite without gaps.

17. A reimaging system as set forth in claim 1, further comprising a barrier defining a separate aperture for each lens set.

18. A reimaging system as set forth in claim 17, wherein said barrier is a baffle of light-absorbing material.

19. A reimaging system as set forth in claim 17, wherein said barrier comprises an opaque substance applied to define an aperture on the face of a second lens in each lens set.

20. An infrared optical system for reimaging an image, which comprises:

a plurality of parallel lens systems nested and focused to transmit contiguous, composite segments of an image from a first focal plane to a second focal plane;

each lens system comprising a first lens coincident with the first focal plane, and a second lens between the first lens and the second focal plane;

an apertured, heat conductive baffle between said first and second lenses wherein each lens system has an aperture positioned and configured to redue stray infrared radiation passing through the second lens; and a separate array of infrared transducers for each lens system positioned at the second focal plane, each said array capable of generating signals responsive to infrared radiation transmitted to it by its respective lens system.

21. A method for transmitting and reproducing an image, comprising the steps of:

transmitting by sets of lenses individual segments of an image on a first focal plane, each said individual segment comprising less than all of said image; and detecting said individual image segments which have been transmitted to a second focal plane;

generating signals in response to the detected image segments; and reproducing the image to be transmitted using the generated signals to form a composite of all the image segments.

22. An infrared reimaging system, comprising:

a plurality of lens sets for transmitting an image on a first focal plane to a second focal plane, each lens set having a plurality of optically aligned lenses;

a first lens in each lens set having a field of view defining a segment of the image at the first focal plane;

the remainder of the lenses in each lens set being operative together with the respective first lenses to transmit to a second focal plane the segment of the image defined by the field of view of the first lens of each lens set;

a barrier substantially impervious to infrared radiation between the first lens and the remainder of the lenses in each lens set, said barrier defining an aperture for each lens set; and at least one detector array for detecting the image segments formed at the second focal plane and for generating signals whereby the transmitted image may be reproduced.

23. A reimaging system as set forth in claim 22, wherein said barrier is a baffle.

24. A reimaging system as set forth in claim 22, wherein said barrier comprises a substance substantially impervious to infrared radiation and applied to define an aperture on the face of a second lens in each lens set.

* * * * *